July 10, 1962     H. MacINNES ETAL     3,043,636

BEARING FOR HIGH SPEED ROTATING SHAFTS

Filed June 29, 1960     2 Sheets-Sheet 1

Inventors
Hugh MacInnes
Stanley H. Updike

Attys

July 10, 1962  H. MacINNES ETAL  3,043,636
BEARING FOR HIGH SPEED ROTATING SHAFTS
Filed June 29, 1960  2 Sheets-Sheet 2
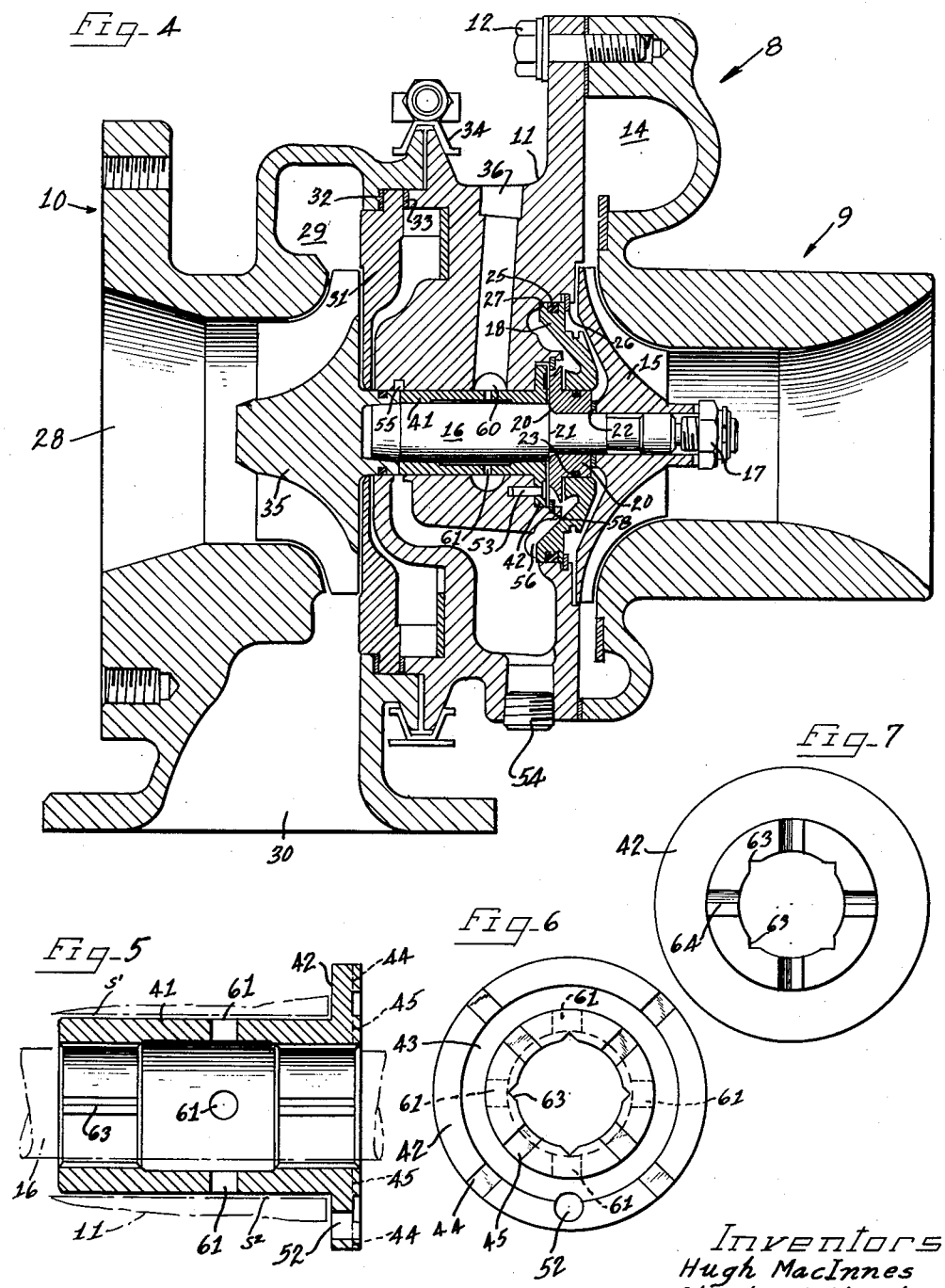
Inventors
Hugh MacInnes
Stanley H. Updike
by Attys.

3,043,636
BEARING FOR HIGH SPEED ROTATING SHAFTS
Hugh MacInnes, Richmond Heights, and Stanley H. Updike, Mentor, Ohio, assignors to Thompson Ramo Wooldridge Inc., Cleveland, Ohio, a corporation of Ohio
Filed June 29, 1960, Ser. No. 39,549
13 Claims. (Cl. 308—121)

This invention relates to bearing means, and is more particularly directed to improved methods and means for providing stationary sleeve bearings for shafts and the like rotating at high speeds.

The state of the art relating to shafts and the like rotating at high speeds, of an order of magnitude of 125,000 r.p.m. and above, is still in its infancy, and contradictory theories are prevalent regarding the methods of manufacturing stable bearings for such shafts.

It is generally recognized, however, that one of the main difficulties associated with the design of bearings for high speed rotary applications is their instability under actual operating conditions. The vibrations induced by the original static unbalance of the shaft and components rotating therewith, while imperceptible at low speeds, become quite pronounced at high speeds. Since high speed rotating shafts, such as turbo pump shafts are lightly loaded, the derivative load imposed on the bearings employed therewith is not unidirectional, as in the case of railroad car bearings and the like. It appears that, at about the critical speed of the rotating shaft and components thereon, the shaft center is caused to rotate by displacement in the direction of shaft rotation but at about half the speed, i.e., the angular velocity of the shaft center in relation to the bearing center is usually about half that of the shaft about the shaft center. Consequently, the effects of the rotating load of the shaft on the bearings likewise becomes quite pronounced.

If a fixed sleeve bearing or a bearing pressed into the shaft housing is employed, this displacement causes metal-to-metal contact between the housing journal and the bearing quickly resulting in failure of the bearings and possible destruction of the equipment with which the shaft is employed.

The interest of the art therefore turned from fixed bearings to employment of bearings constructed in several segments such that each segment was free to pivot on a small fulcrum. Such bearings are commonly known as the "tilting pad type bearings," and, for such applications as steam turbines, have given satisfactory performance to some extent.

However, the tilting pad type bearings require extensive machining and finishing of the bearing, fine tolerances between the bearing and housing and extensive machining and finishing of the housing.

Finishing and machining of the bearings and housings also required careful cleaning of these parts in order to meet the reliability requirements for such high speed equipment when scheduled for use as components of turbochargers and the like. For example, in finishing the housing and bearing, the possibility exists that finishing grit might bury itself in either the bearing or housing. Grit, imbedded in the surface of a bearing or in the surface of the housing adjacent the bearing, acts as a lap and may wear either the bearing or housing down very quickly thereby reducing its use life. Similarly should such grit become imbedded in the bearing surface adjacent the shaft, it acts as a lap on the shaft and reduces the life of the shaft. Thus, employment of such bearings for high speed rotating shaft applications is limited by the cost, requirements of manufacture and other considerations.

Similar problems are associated with another type of bearing employed for applications with such high speed shaft components of turbochargers. The "full floating type" bearing is a hollow cylinder having a plurality of radial apertures formed therein. When assembled, the bearing is positioned so that approximately the same clearance exists between it and the shaft housing as exists between the shaft and the bearing. Axial movement of the bearing is prevented by means of a retaining ring provided at each end of the bearing. Oil is supplied through the housing through the clearance space between the bearing and the housing, and a portion thereof passes through apertures formed in the bearing to a clearance space provided between the bearing and the journal while the remainder of the oil flows between the bearing and the housing. The bearing is free to rotate, and at high operating speeds, it has been our experience that the bearing rotates at a speed somewhere within the range of from about one-third to about one-half the speed of the journal.

However, such bearings are capable of dampening only radial loads and require a hard finished bearing surface in the housing and on the shaft. In addition to the above, the aforesaid disadvantages inherent in the use of the tilting pad type bearings also exist.

The full floating bearings are normally employed in pairs, generally one inserted from each end of the housing. Tolerance requirements thus were stringent. Moreover, the requirement for use of thrust bearings was maximized, thereby further increasing the tolerance requirements of the assembly.

By employment of our invention, we substantially overcome the problems and difficulties of the prior art, and provide simple and effective means for high speed rotating shaft applications including a semi-floating, non-rotating bearing which will accept thrust loads from a shaft rotating at speeds higher than were heretofore considered obtainable in the art.

There are several advantages of employment of our bearing over the heretofore used bearings. First a hard surface in the bearing housing is not required since our bearing is stationary and thus does not require a housing bearing surface. Second, the outer surface of the bearing adjacent the bore of the housing does not require a fine finish. In addition the outer surface of the bearing or the bore of the housing may be ground, if so desired, without concern of grit affecting operation of these parts since they are stationary.

Bearings constructed in accordance with our invention minimize the number of thrust bearings required thus reducing the cost of manufacture considerably. Furthermore, cost of manufacture is reduced since but one bearing is required, and in addition, tolerance requirements are similarly reduced. The ability of our bearing to accept thrust load at the turbine end of a supercharger reduces the amount of shaft overhang at the compressor end normally required in the prior art arrangements where two floating bearings were employed. The oil seal problems are likewise reduced since only a single thrust bearing is required at the compressor end.

It is therefore an object of the present invention to provide bearings for means rotating at high speeds.

It is another object of the present invention to provide sleeve bearings for turbochargers having shafts rotating at high speeds.

It is still another object of the present invention to provide stationary sleeve bearings for shafts rotating at high speeds.

It is a further object of the present invention to provide sleeve bearings for shafts rotating at high speeds which are adapted to accept load imposed by the shaft.

Another object of this invention is to provide shaft stationary sleeve bearings having stability characteristics of withstanding thrust loads as well as radial loads while the shaft is rotating at high speeds.

It is another object of the present invention to provide turbochargers having a single stationary sleeve bearing adapted to accept without becoming unstable radial loads from shafts rotating while unbalanced at high speeds.

It is yet another object of the present invention to provide a method for stabilizing the dynamic balance of a shaft rotating at high speeds with a stationary sleeve bearing adapted to accept loading by the shaft for extended periods of time heretofore considered unobtainable in the art.

These and other objects, features and advantages of the present invention will become more apparent upon a careful consideration of the following detailed description, when considered in conjunction with the accompanying drawing, illustrating preferred embodiments of the concepts of our invention, wherein like reference characters and numerals refer to like or corresponding parts throughout the several views.

On the drawing:

FIGURE 4 is a view in longitudinal section illustrating another embodiment of our invention;

FIGURE 5 is a view in longitudinal cross section illustrating the sleeve bearing of FIGURE 4;

FIGURE 6 is a view in front elevation of the bearing of FIGURE 5, and

FIGURE 7 is a view in elevation of the other end of the bearing of FIGURE 5.

As shown on the drawings:

Briefly stated, the present invention contemplates apparatus for permitting high speed operation of rotating means, such as shafts, which apply a portion of the unbalanced load imposed thereon to sleeve bearing means employed therewith without failure of the bearing means.

While the features of the present invention are hereinafter described in terms of their application to turbochargers, it will be appreciated that our invention contemplates other applications requiring use of an element rotating at high speeds.

Figure 1:
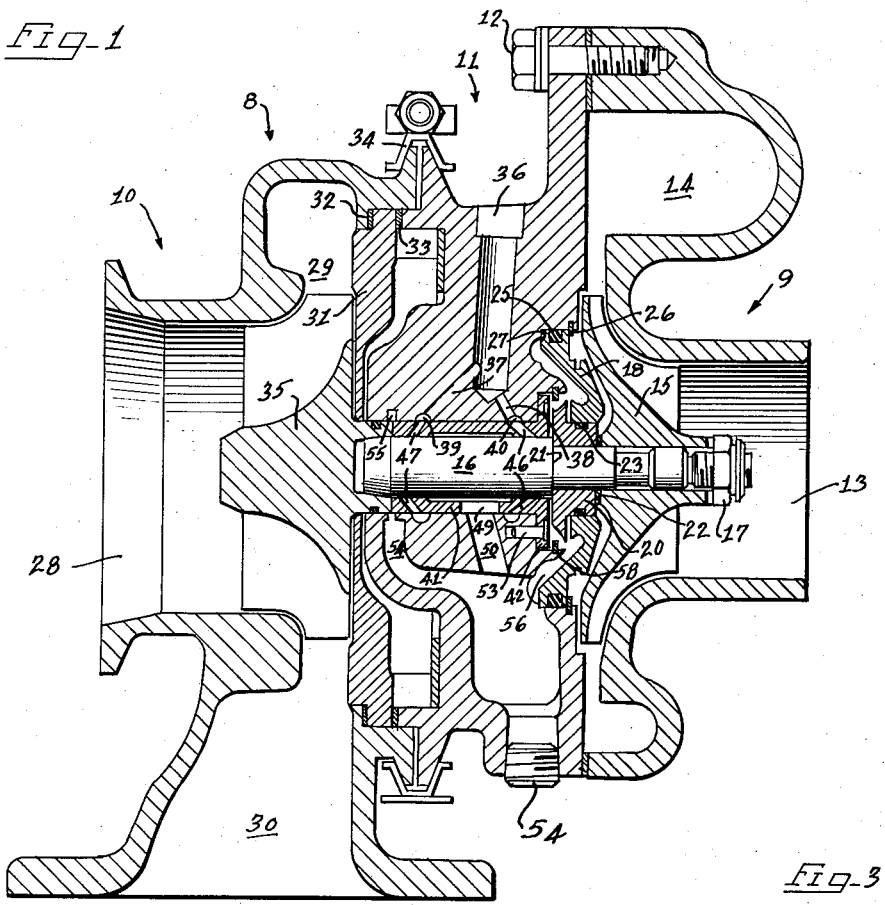
FIGURE 1 is a view in longitudinal section illustrating apparatus constructed in accordance with our invention.

As appears in FIGURE 1, a turbocharger, generally indicated by the numeral 8 comprises three major portions, a compressor section 9, a turbine section 10, and intermediate both sections a shaft housing 11. The compressor section 9 is secured to the shaft housing 11 by suitable means, such as screws 12. Compressor section 9 is provided with a fluid medium inlet 13 and annular discharge passage 14. Compressor impeller means 15 are mounted on a shaft 16 common with the turbine impeller means, and secured to the shaft by means such as nut 17. A spacer 18 is mounted on the shaft housing 11 for thrust bearing 20 which abuts at one end a shoulder 21 on the shaft 16 and is spaced from the compressor means 15 by a suitable seal ring 22. Seal means 23 are provided to prevent leakage of oil from the shaft housing 11 into the compressor section 9. Similar seal means 25 are provided for the same purpose. The spacer 18 is held firmly in place by a back up ring 26 and shoulder 27 provided by the shaft housing.

The turbine section 10 includes an inlet 30 and an annular inlet passage 29 which communicates with the discharge outlet 28. A spacer 31 prevents passage of fluid medium into housing 11 and is firmly seated by a pair of gaskets 32 and 33. Shaft housing 11 may be secured to turbine housing 10 by any suitable means, such as annular clamp 34.

The turbine impeller 35 is recessed to receive shaft 16 and is secured thereto by any suitable means, such as brazing, welding, soldering and the like, for rotation therewith.

A lubricating oil inlet passage 36 is formed in shaft housing 11 which communicates with a pair of branch passages 37 and 38 for introducing oil to a pair of annular recesses 39 and 40. When sleeve bearing 41 is assembled with housing 11 passages 39 and 40 communicate with a plurality of apertures formed in a stationary sleeve bearing 41 for introduction of oil to a space provided between the shaft 16 and bearing 41.

Figure 2:
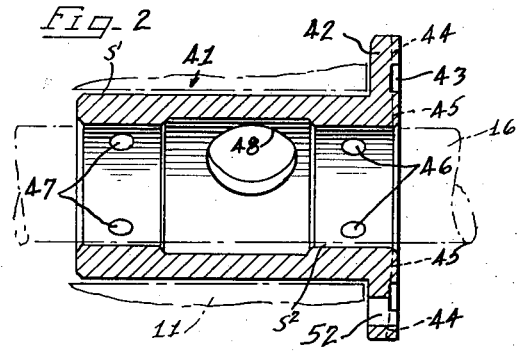
FIGURE 2 is a view in longitudinal section illustrating one form of sleeve bearing found useful in the practice of our invention.

As appears in FIGURE 2, the sleeve bearing 41, constructed of any suitable material such as stainless steel, nylon, or other material having the required strength and other desirable characteristics, is provided at one end with a flange 42.

Figure 3:
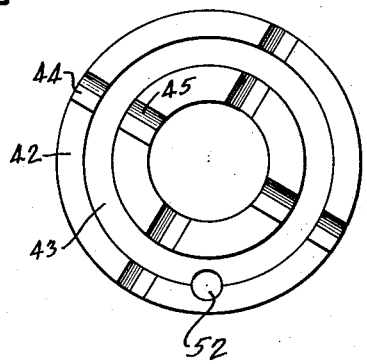
FIGURE 3 is a view in front elevation of the bearing of FIGURE 2.

The flange 42 is provided with an annular recess 43 to permit discharge flow of oil from the clearance space between the housing 11 and outer surface of the bearing 41 received from a plurality of V-shaped recesses 44 formed in the end of the flange. Similar V-shaped recesses 45 are provided inwardly of the annular recess 43 to permit flow of discharge oil from the space between shaft 16 and the inner surface of the bearing 41 (FIGURE 3).

The stepped bore of the bearing is provided with a plurality of apertures 46 formed inwardly of the flanged end to permit flow of oil from annular recess 40 formed in the shaft housing 11. At its opposite end, bearing 41 is provided with a similar plurality of apertures 47 for permitting flow of oil from shaft housing formed annular recess 39. Inwardly of both ends and located intermediate the apertures 46 and 47, in the sleeve a plurality of apertures 48 of enlarged diameter as shown, preferably three in number, are provided in the bearing for facilitating introduction of oil between a clearance space provided between the bearing inner surface and the shaft 16. It will be noted that the apertures 48 are formed in that portion of the bearing which communicates with the substantially centrally located inner portion of the bore of greatest diameter. One of the apertures 49 is preferably positioned, when assembled in the shaft housing, so as to communicate with an oil discharge passage 50 formed in the shaft housing 11 (FIGURE 1).

A spring pin 53 (FIGURE 1), pressed into an aperture formed in shaft housing 11, fits loosely in a bore 52 bearing flange 42 to prevent rotating of the bearing relative to the housing.

The oil discharge passage 50 communicates with a discharge outlet 54 formed in housing 11, and an annular discharge passage 55 is formed in the housing adjacent the turbine impeller 35 for discharge of oil through the passage 54. Similarly the spacer member 18 and housing 11 define an annular passage 56 communicating with oil discharge outlet 54 for permitting discharge of oil flowing from the space between the thrust faces of the bearing flange and thrust bearing 20.

A snap ring 58 is seated in housing 11 and fits firmly but not tightly against the flange 42 of the bearing for preventing unlimited axial movement thereof while allowing the bearing 41 to accept a thrust load from the shaft 16 (FIGURE 1). Suitable seal means as shown are provided to insure a leakproof housing assembly.

In operation, oil under pressure, for example 30 p.s.i., is continuously introduced through passage 36 into the branch passages 39 and 40 from which a portion of the oil flows through the oil clearance space $S^1$ (FIGURE 2) provided between the surface of the housing and the outer surface of the bearing 41. The remainder of the oil flows through the passages 46 and 47 formed in the bearing and passes into the oil clearance space $S^2$ provided between the shaft 16 and the inner surface of the bearing 41.

With the shaft rotating at high speeds, for example, 125,000 r.p.m., a portion of the oil film flowing in the space $S^1$ between the housing and the bearing outer surface flows in one direction out the annular passage 55 and through the discharge outlet 54. The remainder of the oil film in the space $S^1$ between the housing and bearing outer surface also flows over the flange 42, through the V-shaped slots 44 formed in the flange surface, to the annular passage 43, through passage 56 and through the discharge outlet 54.

The oil continuously flowing in the clearance space provided between the inner surface of the bearing and the shaft 16 flows in a similar manner with a portion thereof being discharged through housing passage 50 while a portion thereof flows in one direction between the facing thrust surfaces of turbine 35 and bearing 41 through the outlet passage 55, and the remainder flows in the other direction between the facing thrust surfaces of the thrust bearing 20 and sleeve bearing 41. The V-shaped passages 45 formed in the bearing flange 42 and the annular passage 43 cooperate to facilitate removal of oil and dirt, if any. It will be noted that a portion of the oil continuously flows between the thrust faces of the bearing flange 42 and thrust bearing 20 and a portion of the oil continuously flows between the thrust faces of the bearing and the turbine 35.

Thus the rotating shaft "floats" on the oil film in the space $S^2$ provided between the shaft 16 and the bearing 41 and the bearing "floats" on the oil film in the space $S^1$ provided between the bearing 41 and housing 11, while rotation of the bearing is prevented by pin 53 and axial movement thereof limited by retaining ring 58.

A turbocharger constructed in accordance with our invention has been successfully operated continuously at speeds of about 125,000 r.p.m. for a period of 1000 hours and the dynamic stability of the bearing maintained for this period of time while under the influence of vibrations caused by the dynamic unbalance of the rotating shaft and related rotating components.

In the arrangement of FIGURE 4, a modified embodiment of our invention is shown which constitutes a simplification of the embodiment of FIGURE 1. Identical or similar parts have been indicated by the same reference numerals as in FIGURE 1.

In the embodiment of FIGURE 4, the oil inlet system and the bearing 41 have been modified to the extent shown.

Oil inlet passage 36 communicates with a single annular recess 60 which communicates with four small apertures 61 formed in the bearing 41. Apertures 61 are spaced equidistant around the perimeter of the bearing. It will be noted that the branch passages 39 and 40 are eliminated from the modification appearing in FIGURE 4. Oil, therefore will flow between and through the clearance space between housing 11 and bearing 41 out of the annular passage 55 and also over the flange 42 through the dove-tailed recesses 44 for discharge through outlet 54. A portion of the oil will also pass through the passages 61 and through the clearance space provided between the shaft 16 and inner surface of the bearing. To facilitate flow between the bearing inner surface and shaft 16, a plurality of longitudinally extending V-shaped passages 63 are formed in the bearing inner surface as appears in FIGURES 4, 5 and 6.

As in the case of the embodiment shown in FIGURE 1, a portion of the oil will flow through the clearance space between the inner surface of the bearing and shaft and through the dove-tailed passages 63 out through the clearance space between the end of the shoulder of the turbine impeller and bearing at one end and at the opposite end through the space provided by the flanged end of the bearing and thrust bearing.

The passages 63 serve three major purposes; first, they assure an adequate supply of oil to the thrust surfaces, and, second, when compared with the structure of FIGURE 1 wherein apertures were formed at both ends of the bearing for supply of oil to the clearance space between the bearing and shaft, the grooves 63 facilitate oil flow since the oil is required to travel a distance approximately twice as far from the annular groove 60 to the thrust surfaces between the turbine end of the bearing and the thrust bearing and flange end of the bearing. Thirdly, the dove-tailed axial grooves 63 provide means for the removal of any small particles of dirt or other foreign substance which might not otherwise be removable from between the bearing and shaft. As appears in FIGURE 7, similar dove-tailed grooves 64 are formed in the end surface of the bearing 41 adjacent turbine impeller 35 to facilitate oil flow to passage 55.

Tests performed on the apparatus shown in FIGURE 4 produce results similar to those above described with respect to the apparatus of FIGURE 1. The cost of manufacturing the former apparatus, particularly the bearing 41, is substantially less than that normally required for conventional type thrust bearings.

Thus by employment of our invention, bearing assemblies for shaft means and related rotating elements may be provided which maintain stability at shaft speed levels heretofore considered unobtainable.

Although various minor modifications might be suggested by those versed in the art, it should be understood that we wish to embody within the scope of the patent warranted hereon all such embodiments as reasonably and properly come within the scope of our contribution to the art.

We claim as our invention:

1. Rotary shaft apparatus comprising: a housing; a thrust load receiving shaft in said housing carrying at least two rotatable thrust load producing members in spaced-apart relation; a bearing positioned in spaced-apart relation to said housing and between said shaft-carried, thrust load producing members and circumscribing at least a portion of said shaft in concentric spaced-apart relation thereto and adapted to accept a thrust load produced by said shaft; means for introducing a circumfluous fluid to the space between said housing and said bearing to assist in floating said bearing; at least one aperture formed in said bearing for introducing a portion of said circumfluous fluid to the space between said bearing and said shaft to assist in floating said bearing; a thrust load accepting end flange carried by said bearing adjacent one of said shaft-carried thrust load producing members, an annular groove formed in a surface of said end flange facing said adjacent thrust load producing member; at least one groove formed in said end surface of the flange for permitting flow of fluid from the space between said bearing and said housing to said annular groove; means for preventing unlimited axial movement of said bearing; means for preventing rotation of said bearing, and means for supplying and removing fluid from between said housing and said bearing and from between said shaft and said bearing.

2. Rotary shaft apparatus comprising: a housing; a thrust load receiving shaft in said housing carrying at least two rotatable thrust load producing members in spaced-apart relation; a bearing positioned in spaced-apart relation to said housing and between said shaft carried thrust load producing members and circumscribing at least a portion of said shaft in concentric spaced-apart relation thereto and adapted to accept a thrust load produced by said shaft; means for introducing a circumfluous fluid to the space between said housing and said bearing; at least one aperture formed in said bearing for introducing a portion of said circumfluous fluid to the space between said bearing and said shaft; thrust load accepting end flange carried by said bearing adjacent one of said shaft carried thrust load producing members; an annular groove formed in a surface of said end flange facing said shaft-carried, thrust-load producing member; at least one groove formed in said end flange surface for permitting flow of fluid from the space between said housing and said bearing to said annular groove; at least one groove formed in said end flange surface for permitting flow of fluid from the space between said bearing and said shaft to said annular groove; means for preventing unlimited axial movement of said bearing;

means for preventing rotation of said bearing, and means for supplying and removing fluid from between said housing and said bearing and from between said shaft and said bearing.

3. Rotary shaft apparatus comprising: a housing; a thrust load receiving shaft in said housing carrying at least two rotatable thrust load producing members in spaced-apart relation; a bearing positioned in spaced-apart relation to said housing and between said thrust load producing members and circumscribing at least a portion of said shaft in concentric spaced-apart relation thereto and adapted to accept a thrust load produced by said shaft; means for introducing a circumfluous fluid to the space between said housing and said bearing; at least one aperture formed in said bearing for introducing circumfluous fluid to the space between said bearing and said shaft; a thrust load accepting end flange carried by said bearing adjacent one of said shaft-carried, thrust load producing members; an annular groove formed in a surface of said end flange facing said shaft-carried, thrust load producing member; at least one V-shaped groove formed in said end flange surface for permitting flow of fluid from the space between said housing and said bearing to said annular groove; at least one V-shaped groove formed in said end flange surface for permitting flow of fluid from the space between said shaft and said bearing to said annular groove; means for preventing unlimited axial movement of said bearing; means for preventing rotation of said bearing, and means for suppling and removing fluid from between said housing and said bearing and from between said shaft and said bearing.

4. Rotary shaft apparatus comprising: a housing; a thrust load receiving shaft in said housing carrying at least two rotatable thrust load producing members; a bearing positioned in spaced-apart relation to said housing between said thrust load producing members and circumscribing at least a portion of said shaft in concentric spaced-apart relation thereto and adapted to accept a thrust load produced by said shaft; means for introducing a circumfluous fluid to the space between said housing and said bearing; at least one aperture formed in said bearing for introducing a portion of said circumfluous fluid to the space between said bearing and said shaft; a thrust load accepting end flange carried by said bearing adjacent one of said shaft-carried, thrust producing members; an annular groove formed in an end flange surface facing said adjacent thrust load producing member; a V-shaped groove formed in said flange end surface for permitting flow of fluid from the space between said housing and said bearing to said annular groove; at least one V-shaped groove formed in said end face surface for permitting flow of fluid from the space between said bearing and said shaft to said annular groove; an aperture formed in said end flange adapted to receive means for preventing rotation of said bearing; means for preventing unlimited axial movement of said bearing; and means for supplying and removing fluid from the spaces between said shaft and said bearing and between said housing and said bearing.

5. Rotary shaft apparatus comprising: a housing; a thrust load receiving shaft in said housing carrying at least two rotatable thrust load producing members; a bearing positioned in spaced-apart relation to said housing and between said shaft-carried, thrust load producing members and circumscribing at least a portion of said shaft in spaced-apart relation thereto and adapted to accept a thrust load produced by said shaft; means for introducing a circumfluous fluid to the space between said housing and said bearing; at least one aperture formed in said bearing for introducing a portion of said circumfluous fluid to the space between said bearing and said shaft; a thrust load accepting end flange carried by said bearing adjacent one of said shaft-carried, thrust load producing member; an annular groove formed in an end flange surface facing said adjacent thrust load producing member; at least one V-shaped groove formed in said end face surface for permitting flow of fluid from the space between said housing and said bearing to said annular groove; at least one V-shaped groove formed in said end face surface for permitting flow of fluid from the space between said bearing and said shaft to said annular groove; an aperture formed in said end flange adapted to receive means for preventing rotation of said bearing; retaining means abutting said end flange for preventing unlimited axial movement of said bearing; and means for supplying and removing fluid from the spaces between said housing and said bearing and between said shaft and said bearing.

6. Rotary shaft apparatus comprising: a housing; a thrust load producing shaft in said housing carrying at least two rotatable thrust load producing members in spaced-apart relation; a sleeve bearing positioned in spaced-apart relation to said housing and between said shaft-carried, thrust load producing members and circumscribing at least a portion of said shaft in spaced-apart relation thereto and adapted to accept a thrust load produced by said shaft, said bearing having a plurality of apertures formed therein for introducing circumfluous fluid to the space between said bearing and said shaft; a thrust load accepting end flange carried by said bearing adjacent one of said shaft-carried, thrust load producing members; an annular groove formed in an end flange surface facing said shaft-carried thrust load producing member, at least one V-shaped groove formed in said end face surface for permitting flow of fluid from the space between said housing and said bearing to said annular groove; at least one V-shaped groove formed in said end flange surface for permitting flow of fluid from the space between said bearing and said shaft to said annular groove; an aperture formed in said bearing end flange adapted to receive means for preventing rotation of said bearing; retaining means overlying said end flange for preventing unlimited axial movement of said bearing; housing formed fluid inlet passages for continuously introducing circumfluous fluid to the space between said housing and said bearing, said bearing apertures communicating with said space between said housing and said bearing for introducing a portion of said circumfluous fluid to a centrally located stepped portion of the bore of said bearing, and means for removing said fluid from between said housing and said bearing and said shaft and said bearing.

7. A bearing assembly comprising, a housing having a shaft bore, a one-piece full tubular bearing floating in said bore, said bearing having an axial length greater than the diameter thereof, means anchoring said bearing against rotation in the bore, a shaft floating in said bearing in rotatable relation, radial abutments on said shaft adjacent the ends of the bearing, end walls on said bearing cooperating with said abutments in thrust bearing relation, passage means in said housing for flowing lubricant between the housing and bearing, passage means in said bearing for flowing lubricant from the housing passage means between said shaft and bearing, and passage means in said end walls of the bearing for flowing fluid from the bearing to said end walls whereby films of fluid may be maintained between the bearing and the housing, between the shaft and the bearing, and between the bearing and the abutments to dampen vibrations from the shaft.

8. A radial and thrust bearing assembly comprising a housing having a shaft bore with a countersunk enlarged bore at one end thereof providing a radial shoulder, a one piece tubular bearing floating in said bore and having an outturned flange at one end thereof in said counterbore, a pin extending through said flange into said housing holding said bearing against rotation in the bore, a snap ring in said counterbore overlying said flange to retain the bearing axially in the bore, the outer face of said flange and the opposite end of the bearing providing radial thrust bearing surfaces, a shaft rotatably mounted in said bearing, radial abutments on said shaft overlying the thrust faces of the bearing for thrust bearing engagement therewith, and means for circulating fluid between the bearing and the shaft, between the housing and the bearing, and between the abutments and thrust bearing surfaces.

9. A bearing for a housing having an elongated shaft bore with a counterbore at one end thereof which comprises a one piece metal tube having an outer diameter fitting freely in said bore to float the tube in the bore and having an inner diameter for freely embracing a shaft to float the shaft in the bearing, one end of said bearing having an outturned flange seated in said counterbore and providing a first radial thrust face, the other end of said bearing terminating in said shaft bore and providing a second thrust face, and said bearing having passages connecting the inner and outer peripheries thereof with the thrust bearing surfaces for free circulation of fluid to float the bearing in the bore, to float the shaft in the bearing and to float abutments on the shaft relative to the thrust bearing surfaces.

10. A combined one piece radial and thrust bearing which comprises a one-piece full tube having a cylindrical outer periphery sized for floating in the bore of a housing and an inner periphery sized for floating a shaft at opposite ends of the tube and spaced from the shaft intermediate said opposite ends to provide a chamber for receiving lubricant, an end flange on said tube having an annular groove around the outer face thereof, radial grooves in said outer face of the flange communicating with said annular groove, and axial grooves in the inner periphery of the tube communicating with the inner end of said radial grooves whereby fluid from the chamber will flow through said grooves to lubricate the bearing surfaces inside of the tube and the thrust bearing surface provided by the outer face of the flange.

11. A one piece combination radial and thrust bearing which comprises a tube of greater axial length than diameter, said tube having an enlarged internal diameter central bore section separating axially spaced radial bearing surfaces in the ends of the tube, one end of said tube having an outturned flange with an outer face providing a thrust bearing surface, the other end of said tube having a radial face terminating within the confines of the outer circumference of the tube and providing a second thrust bearing surface, passage means joining the outer periphery of the tube with the enlarged bore in the tube, additional passage means in the tube connecting said enlarged bore with the end thrust faces of the tube, and the thrust face of said flange having passage means joined with the passage means in the tube for circulating fluid to the thrust face of the flange.

12. A bearing assembly comprising a housing having a shaft bore and a radial shoulder, a one piece full tubular bearing floating in said bore, end walls at opposite ends of said bearing providing thrust bearing surfaces, one of said end walls being bottomed on said shoulder, the other one of said end walls terminating within the confines of the outer circumference of the bearing, means holding said bearing against rotation in the bore, a shaft floating in said bearing in rotatable relation having thrust faces riding on said end walls, means for maintaining films of fluid between the bearing and the housing and between the shaft and the bearing to dampen vibrations from the shaft, and means for circulating fluid between the bearing and the shaft, between the housing and the bearing, and between said end walls and thrust faces.

13. A combined one-piece sleeve and thrust bearing adapted for floating in a housing having a shaft bore and a radial shoulder to provide a combined radial and thrust bearing for a shaft having radial thrust surfaces, which comprises a one-piece tube having an internal shaft receiving periphery, an external periphery adapted to float in the housing bore, end walls providing opposed thrust bearing surfaces for the thrust faces of a shaft, one of said end walls terminating within the confines of the outer periphery of the tube to accommodate assembly of the tube in a housing bore, the other of said end walls extending radially outward from the outer periphery of the tube to provide an abutment flange for bottoming on the shoulder of a housing, passage means joining the exterior and interior peripheries of the tube, additional passage means joining the interior periphery of the tube with the thrust surface provided by said flange, and a pin receiving aperture in said flange for coacting with a pin carried by the shoulder portion of a housing to hold the sleeve bearing against rotation in the housing.

References Cited in the file of this patent
UNITED STATES PATENTS

| | | |
|---|---|---|
| 1,636,499 | Chapman et al. | July 19, 1927 |
| 2,532,795 | Underwood et al. | Dec. 5, 1950 |
| 2,941,851 | Bayer | June 21, 1960 |